US 8,446,968 B2

United States Patent
Jeong (10) Patent No.: US 8,446,968 B2
(45) Date of Patent: May 21, 2013

(54) OFDM RECEIVING APPARATUS AND MODE DETECTING METHOD THEREOF

(75) Inventor: Ki Cheol Jeong, Seoul (KR)

(73) Assignee: Core Logic, Inc., Seoul (KR)

(*) Notice: Subject to any disclaimer, the term of this patent is extended or adjusted under 35 U.S.C. 154(b) by 1069 days.

(21) Appl. No.: 12/425,662

(22) Filed: Apr. 17, 2009

(65) Prior Publication Data

US 2009/0262857 A1    Oct. 22, 2009

(30) Foreign Application Priority Data

Apr. 17, 2008  (KR) .................. 10-2008-0035809

(51) Int. Cl.
*H04L 27/00* (2006.01)
*H04K 1/10* (2006.01)

(52) U.S. Cl.
USPC ........................... 375/260; 375/316; 375/347

(58) Field of Classification Search
USPC ................... 375/260, 267, 316, 347
See application file for complete search history.

(56) References Cited

U.S. PATENT DOCUMENTS

| | | | | |
|---|---|---|---|---|
| 2004/0228270 A1* | 11/2004 | Chen et al. | .................. | 370/210 |
| 2004/0240379 A1* | 12/2004 | Tsuie | .................. | 370/210 |
| 2005/0100118 A1* | 5/2005 | Zhang | .................. | 375/343 |
| 2005/0265488 A1* | 12/2005 | Jung | .................. | 375/340 |
| 2008/0247307 A1* | 10/2008 | Zhao | .................. | 370/208 |
| 2010/0027724 A1* | 2/2010 | Hayashi et al. | .................. | 375/343 |

* cited by examiner

*Primary Examiner* — Sam K Ahn
*Assistant Examiner* — Freshteh N Aghdam
(74) *Attorney, Agent, or Firm* — Nath, Goldberg & Meyer; Jerald L. Meyer; Joshua B. Goldberg (57) ABSTRACT

Provided are an orthogonal frequency division multiplexing (OFDM) receiving apparatus and a mode detecting method thereof. The mode detecting method includes: detecting a first mode of a received signal by using first delay signals obtained by delaying the received signal, and first correlation values of the received signal; and detecting a second mode of the received signal by using second delay signals obtained by delaying a first correlation value corresponding to the first mode from among the first correlation values, and the first correlation value corresponding to the first mode. According to the OFDM receiving apparatus and the mode detecting method, a fast Fourier transform (FFT) mode is detected first and then a guard interval (GI) mode is detected based on a result of detecting the FFT mode from the same signal, and thus mode detection is accurately and quickly performed and the OFDM receiving apparatus has a reduced chip size.

16 Claims, 8 Drawing Sheets

OFDM RECEIVING APPARATUS AND MODE DETECTING METHOD THEREOF

CROSS-REFERENCE TO RELATED PATENT APPLICATION

This application claims the benefit of Korean Patent Application No. 10-2008-0035809, filed on Apr. 17, 2008, in the Korean Intellectual Property Office, the disclosure of which is incorporated herein in its entirety by reference.

BACKGROUND OF THE INVENTION

1. Field of the Invention

The present invention relates to mode detection in an initial synchronization process of an orthogonal frequency division multiplexing (OFDM) receiving apparatus, and more particularly, to an OFDM receiving apparatus and a mode detecting method thereof, where the OFDM receiving apparatus and a mode detecting method thereof perform accurate and quick mode detection by first detecting a fast Fourier transform (FFT) mode and then detecting a guard interval (GI) mode by using a result of detecting the FFT mode in the same signal, and the OFDM receiving apparatus has a small chip size.

2. Description of the Related Art

Generally, a broadcasting system of a high definition television (HDTV) compresses digital data at about 1 Gbps and obtained from a high definition image source into data in a range of about 15 to about 18 Mbps, and transmits digital data in tens of Mbps via a limited band channel in a range of about 6 to about 8 MHz.

As such, a modulation method used in the broadcasting system of the HDTV requires high band efficiency, since in the modulation method, the digital data in tens of Mbps is transmitted via the limited band channel. Also, since the HDTV uses a simulcast method using a channel in a very high frequency (VHF)/ultrahigh frequency (UHF) band that is assigned for analog TV, the HDTV must not be affected by channel interference due to an analog TV signal.

In order to increase the transmission efficiency per bandwidth and prevent interference, an orthogonal frequency division multiplexing (OFDM) method from among digital modulation methods is used as a next generation HDTV broadcasting method. In the OFDM method, a symbol column received in series is converted into parallel data in a predetermined block unit, and parallelized symbols are multiplexed to different subcarrier frequencies.

The OFDM method uses a multicarrier, wherein carriers of the multicarrier are orthogonal to each other. When a result of multiplying two carriers is 0, the two carriers are orthogonal to each other, and such orthogonal carriers are used to increase the spectrum efficiency since spectrums of the carriers overlap.

In the OFDM method, a receiver synchronizes with a transmitter in order to extract digital data from a modulated signal. During such a synchronization process between the receiver and the transmitter, a fast Fourier transform (FFT) mode and a guide interval (GI) mode are detected from a received signal.

As described above, before the transmitter transmits data, an inverse FFT is performed on the data, and thus the receiver demodulates a received signal via a FFT. Accordingly, the receiver is able to determine a starting point and an effective data period of a symbol on which the FFT is to be performed.

The starting point and the effective data period of the symbol differ according to a FFT mode and a GI mode of a system. Here, the FFT mode is an interleaving method performed to minimize effects caused by an error that may be generated while transmitting and receiving a signal. For example, the FFT mode is determined to be one of 2K, 4K, and 8K modes.

Also, the GI mode is based on a length of a protection period that is inserted between each symbol in order to prevent interference between the symbols. The protection period is prepared by copying lower predetermined bit values of data in the effective data period. Here, the GI mode is determined to be one of $1/4$, $1/8$, $1/16$, and $1/32$ modes, based on a length of the protection period, i.e., the length of lower bits of effective data.

However, a lot of time is consumed for the receiver to detect a mode of a system. Also, since each mode is detected by using signals received via different channels, an error may occur while detecting a mode.

SUMMARY OF THE INVENTION

The present invention provides mode detecting method in an orthogonal frequency division multiplexing (OFDM) receiving apparatus that accurately and quickly performs mode detection and has a reduced chip size.

According to an aspect of the present invention, there is provided a mode detecting method in an OFDM receiving apparatus, the mode detecting method including: detecting a first mode of a received signal by using first delay signals obtained by delaying the received signal, and first correlation values of the received signal; and detecting a second mode of the received signal by using second delay signals obtained by delaying a first correlation value corresponding to the first mode from among the first correlation values, and the first correlation value corresponding to the first mode.

According to another aspect of the present invention, there is provided an OFDM receiving apparatus including: a first mode detecting unit which detects a first mode of a received signal by using first delay signals obtained by delaying the received signal, and first correlation values of the received signal; and a second mode detecting unit which detects a second mode of the received signal by using second delay signals obtained by delaying a first correlation value corresponding to the first mode from among the first correlation values, and the first correlation value corresponding to the first mode.

BRIEF DESCRIPTION OF THE DRAWINGS

The above and other features and advantages of the present disclosure will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown. In the drawings, like reference numerals denote like elements.

Figure 1:
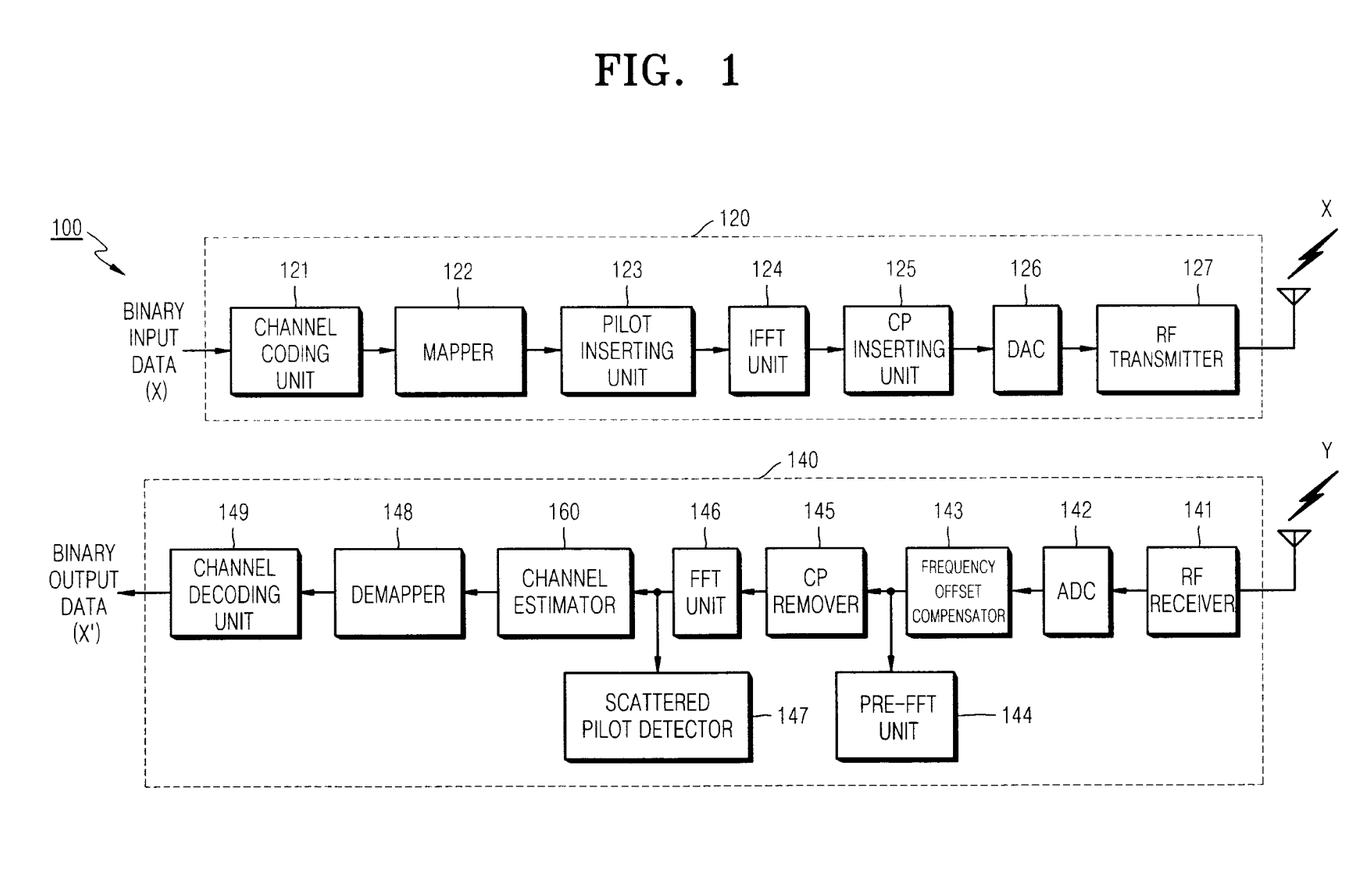
FIG. 1 is a block diagram of a transmitter and a receiver of an orthogonal frequency division multiplexing (OFDM) communication system according to an embodiment of the present disclosure.

FIG. 1 is a block diagram of a transmitter 120 and a receiver 140 of an orthogonal frequency division multiplexing (OFDM) communication system 100 according to an embodiment of the present invention.

Referring to FIG. 1, the transmitter 120 includes a channel coding unit 121, a mapper 122, a pilot inserting unit 123, an inverse fast Fourier transform (IFFT) unit 124, a cyclic prefix (CP) inserting unit 125, a digital-analog-converter (DAC) 126, and a radio frequency (RF) transmitter 127. The receiver 140 includes an RF receiver 141, an analog-digital-converter (ADC) 142, a frequency offset compensator 143, a CP remover 145, a FFT unit 146, a channel estimator 160, a demapper 148, and a channel decoding unit 149.

Meanwhile, the receiver 140 further includes a pre-FFT unit 144, which obtains synchronization of a symbol and is disposed between the frequency offset compensator 143 and the CP remover 145, and a scattered pilot detector 147 that extracts scattered pilots.

In the transmitter 120, the channel coding unit 121 codes input data X to be transmitted, and then the mapper 122 modulates the input data X according to a corresponding modulation method. Then, the pilot inserting unit 123 inserts pilots, the IFFT unit 124 performs IFFT, and then the CP inserting unit 125 inserts a CP. Next, the DAC 126 performs digital-analog conversion, and the RF transmitter 127 outputs a signal X via a channel of a corresponding bandwidth.

In the receiver 140, the RF receiver 141 receives a signal Y from the transmitter 120. A relationship between the received signal Y and the input data X may be represented by Equation 1 below.

$$Y=H*X+n \quad (1)$$

Here, H denotes a channel and n denotes noise.

The receiver 140 estimates the channel H, and estimates the input data X by using the estimated channel H, as will be described in detail below.

In the receiver 140, the ADC 142 performs analog-digital conversion on the signal Y received via the RF receiver 141, and then the frequency offset compensator 143 compensates for a sampling frequency offset. Then, the CP remover 145 removes a CP, and then the FFT unit 146 performs a FFT.

Next, the scattered pilot detector 147 detects pilots included in each symbol of a channel, and the channel estimator 160 estimates a channel based on the detected pilots. When the channel is estimated by the channel estimator 160, the input data X is estimated by using the channel. Then, the demapper 148 and the channel decoding unit 149 perform a demapping process and a channel decoding process so as to extract the input data X.

The receiver 140 may estimate the input data X as Equation 2 below.

$$X'=Y/H'=H*X/H'+n/H' \quad (2)$$

Here, X' denotes estimated input data and H' denotes an estimated channel.

However, before the receiver 140 of the OFDM communication system 100 performs the above operations, a FFT mode and a guard interval (GI) mode of the OFDM communication system 100 are detected from the received signal Y, since as described above, the input data X is accurately estimated only when the FFT mode (an interleaving method during an IFFT of the receiver 140), and the GI mode (the length of a protection period inserted between symbols) are known.

An interleaving method and a method of setting a protection period in the OFDM communication system 100 will now be described in brief.

Figure 2:
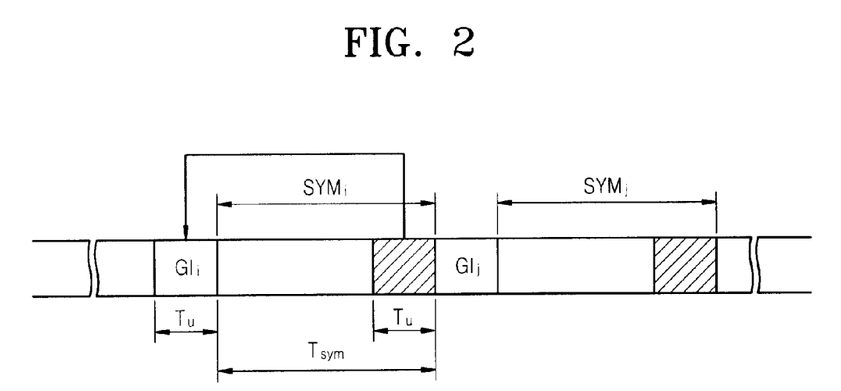
FIG. 2 is a diagram for describing a method of setting a protection period in the OFDM system of FIG. 1, according to an embodiment of the present disclosure.

FIG. 2 is a diagram for describing the method of setting a protection period in the OFDM communication system 100 of FIG. 1, according to an embodiment of the present invention Referring to FIG. 2, the transmitter 120 inserts protection periods GIi and GIj according to a GI mode between adjacent symbols SYMi and SYMj, respectively, in order to prevent interference between the symbols SYMi and SYMj. Here, each of the protection periods GIi and GIj are generated by copying end parts (slashed portions) of their corresponding symbols SYMi and SYMj, and thus values of the protection periods GIi and GIj are equal to the end parts of the symbols SYMi and SYMj.

Here, $T_{sym}$ denotes an effective symbol period that differs according to a FFT mode. Also, $T_u$ denotes a protection period that differs according to a GI mode. As described above, an OFDM-based signal is demodulated via a FFT, and accordingly, detecting of the FFT mode and the GI mode, wherein a starting point and an effective data period of a symbol are searched for, need to be performed first. The detecting of the FFT mode and the GI mode may be performed by the pre-FFT unit 144 of the receiver 140 in the OFDM communication system 100 of FIG. 1.

A mode detection operation of an OFDM receiving apparatus according to an embodiment of the present invention will now be described in detail.

Figure 3:
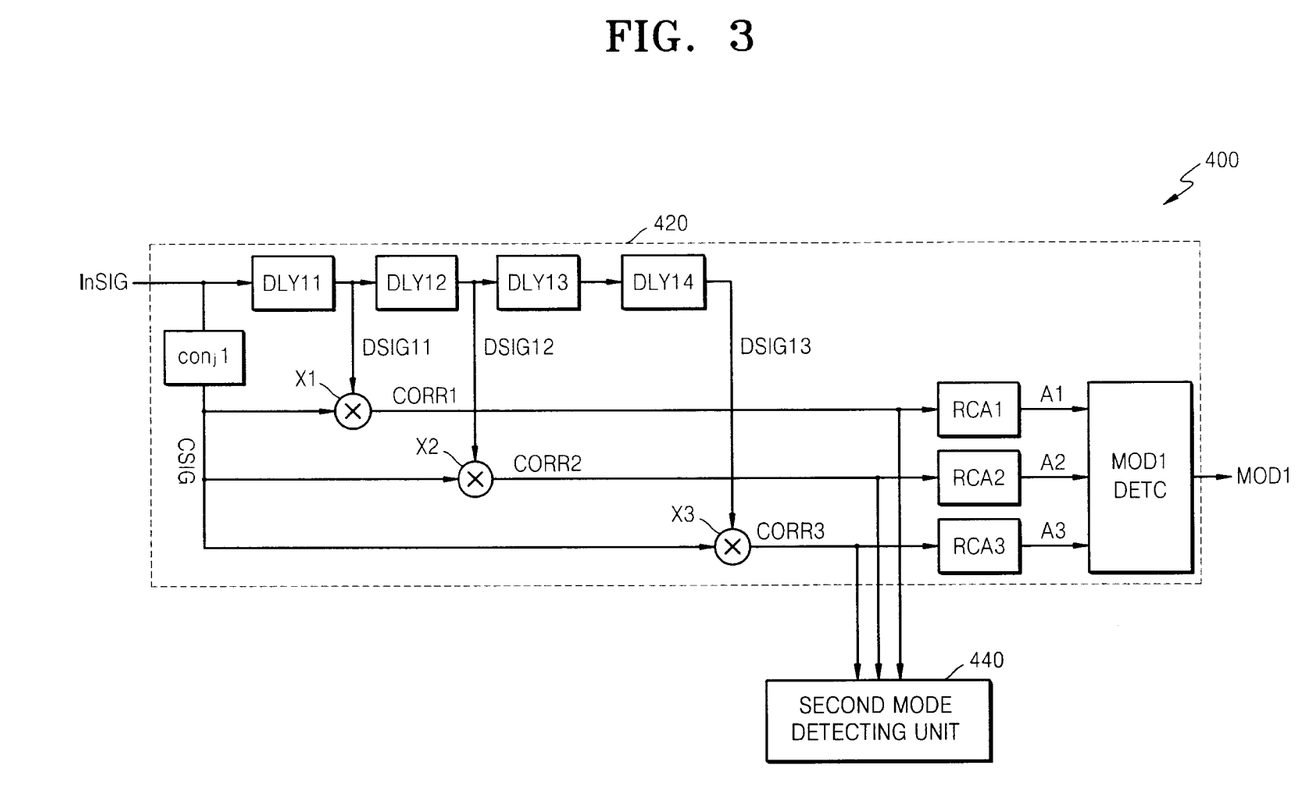
FIG. 3 is a detailed block diagram of an OFDM receiving apparatus according to an embodiment of the present disclosure.

FIG. 3 is a detailed block diagram of an OFDM receiving apparatus 400 according to an embodiment of the present invention.

Referring to FIG. 3, the OFDM receiving apparatus 400 includes a first mode detecting unit 420 and a second mode detecting unit 440.

The first mode detecting unit 420 detects a first mode MOD1 of a received signal InSIG, by using first delay signals DSIG11, DSIG12, and DSIG13 obtained by delaying the received signal InSIG, and first correlation values CORR1 through CORR3 of the received signal InSIG. Here, the first mode MOD1 may be a FFT mode. Hereinafter, the first mode MOD1 is described as the FFT mode.

In order to detect the first mode MOD1 of the received signal InSIG, the first mode detecting unit 420 may include first delay circuits DLY11 through DLY14, a conjugator conj1, multipliers X1 through X3, adders RCA1 through RCA3, and a first mode detector MOD1 DETC.

The first delay circuits DLY11 through DLY14 respectively generate the first delay signals DSIG11 through DSIG13 by delaying the received signal InSIG. As described above, the FFT mode may be one from among 2K, 4K, and 8K modes. The number of first delay circuits DLY11 through DLY14 may corresponds to the number of types of the first mode MOD1.

According to the OFDM receiving apparatus 400, the first delay circuits DLY11 through DLY14 may each perform 2K-sample delay. Accordingly, the first delay signal DSIG11 is obtained by the first delay circuit DLY11 delaying the received signal InSIG by 2K samples, and the first delay signal DSIG12 is obtained by the first delay circuit DLY12 delaying the received signal InSIG by 4K samples. Similarly, the first delay signal DSIG13 is obtained by the first delay circuits DLY13 and DLY14 delaying the received signal InSIG by 8K samples. Here, both of the first delay circuits DLY13 and DLY14, which delay a 2K sample, are used for the first delay signal DSIG13, however one delay circuit that delays a 4K sample may also be used.

The conjugator conj1 generates a conjugate complex signal CSIG of the received signal InSIG, and the multipliers X1 through X3 respectively output the first correlation values CORR1 through CORR3 by multiplying the conjugate complex signal CSIG by their corresponding first delay signals DSIG11 through DSIG13. The adders RCA1 through RCA3 obtains accumulation values A1 through A3 of their corresponding first correlation values CORR1 through CORR3. The adders RCA1 through RCA3 will be described in detail later with reference to FIGS. 5 through 7.

Meanwhile, the first mode detector MOD1 DETC detects a FFT mode by detecting the maximum accumulation value from among the accumulation values A1 through A3 output from the adders RCA1 through RCA3. The detecting of a FFT mode by using the maximum accumulation value is well known to one of ordinary skill in the art, and thus details thereof are omitted herein.

Accordingly, the OFDM receiving apparatus 400 according to the current embodiment may simply detect a FFT mode by performing one detecting operation on an OFDM signal received in a predetermined FFT mode, and by using the first delay circuits DLY11 through DLY14 connected in series. In other words, an operation for detecting a FFT mode does not need to be repeatedly performed. In the present invention, an OFDM signal in a certain FFT mode is accumulated in one of the adders RCA1 through RCA3, and the certain FFT mode is detected by searching for the maximum accumulation value among the accumulation values of the adders RCA1 through RCA3.

When the FFT mode is detected via the first mode detecting unit 420, a second mode, i.e., the GI mode, is detected by the second mode detecting unit 440. A detailed structure and operations of the second mode detecting unit 440 will be described later with reference to FIGS. 8 and 9.

Figure 4:
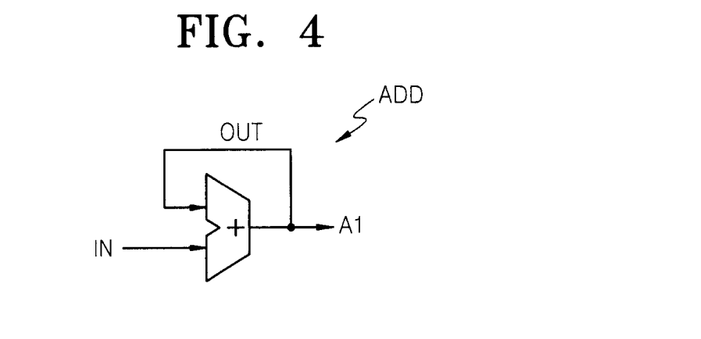
FIG. 4 is a diagram of a general addition logic circuit used in adders of a first mode detecting unit shown in FIG. 3.

FIG. 4 is a diagram of a general addition logic circuit ADD may be used in the adders RCA1 through RCA3 of the first mode detecting unit 420 illustrated in FIG. 3.

Referring to FIG. 4, the general addition logic circuit ADD outputs an accumulation value A1 by adding an input value IN and an output value OUT. In order to calculate the accumulation value A1, the general addition logic circuit ADD includes a storage space, i.e., a memory, having a size corresponding to a size of the input value IN and the accumulation value A1. Accordingly, when the general addition logic circuit ADD is used in the adders RCA1 through RCA3 of the first mode detecting unit 420, the size of the memory is increased so as to accumulate at least a predetermined number of correlation values.

Figure 5:
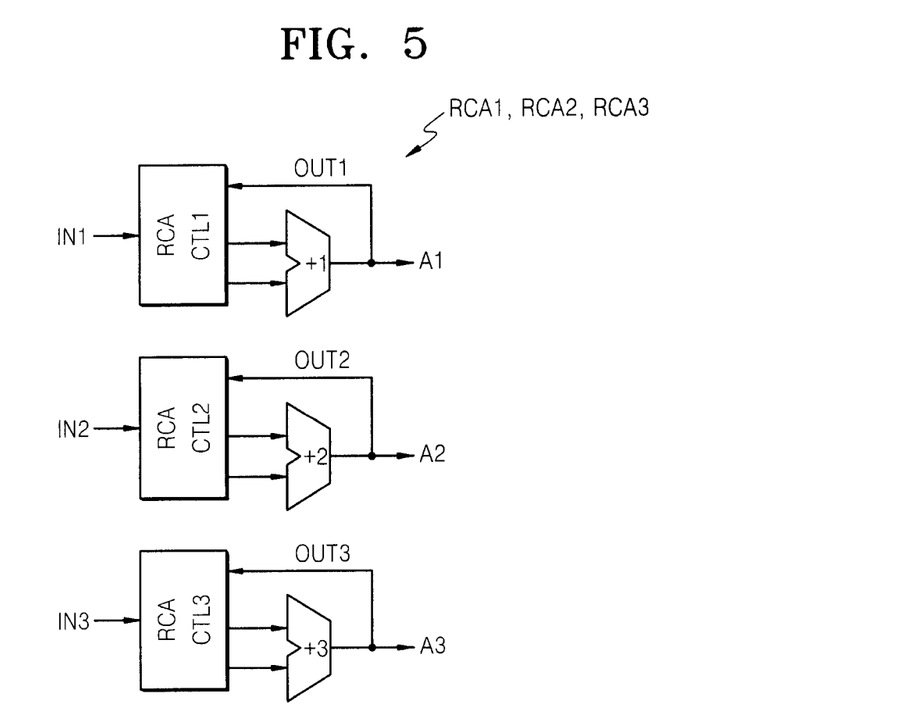
FIG. 5 is a diagram of adders having different structures from the one of FIG. 4, which may be used as the adders of the first mode detecting unit of FIG. 3.

FIG. 5 is a diagram of the adders RCA1 through RCA3 having different structures from that of the one in FIG. 4, which may be used as the adders RCA1 through RCA3 of the first mode detecting unit 420 of FIG. 3.

Referring to FIG. 5, the adders RCA1 through RCA3 respectively include first through third addition logic circuits +1 through +3 and first through third controllers RCA CTL1 through RCA CTL3. In other words, the adder RCA1 includes the first addition logic circuit +1 and the first controller RCA CTL1, the adder RCA2 includes the second addition logic circuit +2 and the second controller RCA CTL2, and the adder RCA3 includes the third addition logic circuit +3 and the third controller RCA CTL3. The current embodiment of the present invention uses three adders RCA1 through RCA3 correspondingly to 3 correlation values, wherein the 3 correlation values are respectively input to the adders RCA1 through RCA3, but when the number of correlation values increases, the number of adders may also increase.

In the present embodiment, the functions of the first through third addition logic circuits +1 through +3 are identical to the functions of the general addition logic circuit ADD of FIG. 4. Meanwhile, the first through third controllers RCA CTL1 through RCA CTL3 actively control memories of the first through third addition logic circuits +1 through +3, respectively, by minimizing the use of the memories. Detailed operations of the adders RCA1 through RCA3 will be described later with first through third memories |A1| through |A3| illustrated in FIG. 6.

Figure 6:
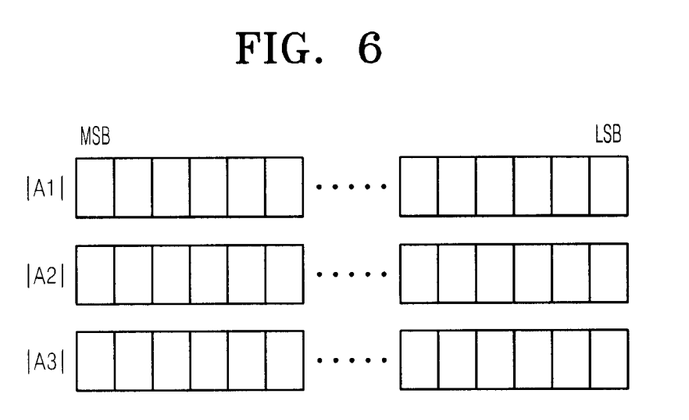
FIG. 6 is a diagram of memories included in additional logic circuits shown in FIG. 5.

FIG. 6 is a diagram of the first through third memories |A1| through |A3| respectively included in the first through third additional logic circuits +1 through +3 illustrated in FIG. 5. For convenience of description, the first through third memories |A1| through |A3| are described also with reference to FIG. 5.

Referring to FIG. 6, the first through third addition logic circuits +1 through +3 include the first through third memories |A1| through |A3| in order to perform an accumulation operation. In other words, the first addition logic circuit +1 includes the first memory |A1|, the second addition logic circuit +2 includes the second memory |A2|, and the third addition logic circuit +3 includes the third memory |A3|. In FIG. 6, MSB denotes a most significant bit, and LSB denotes a least significant bit. Sizes of the first through third memories |A1| through |A3| may be identical or different. However, when the sizes of the first through third memories |A1| through |A3| are different, an accumulation value may not exceed the size of a memory having the smallest size. Meanwhile, each of the first through third addition logic circuits +1 through +3 includes a memory, however a memory may be disposed outside the first through third addition logic circuits +1 through +3, so as to be used when the first through third addition logic circuits +1 through +3 perform an addition operation.

The operations of the adders RCA1 through RCA3 of FIG. 5 will be described again with the first through third memories |A1| through |A3|. The first through third addition logic circuits +1 through +3 output their corresponding accumulation values A1 through A3 obtained by adding input values IN1 through IN3 of corresponding correlation values and corresponding storage values OUT1 through OUT3. Here, the storage values OUT1 through OUT3 and the accumulation values A1 through A3 are classified for convenience of description, and have the same values. In other words, the accumulation values A1 through A3 that are input to their corresponding first through third addition logic circuits +1 through +3 via first through third controllers RCA CTL1 through RCA CTL3 are referred to as the storage values OUT1 through OUT3.

The first through third memories |A1| through |A3| store the accumulation values A1 through A3 of their corresponding first through third addition logic circuits +1 through +3. In other words, the first memory |A1| stores the accumulation value A1 of the first addition logic circuit +1, the second memory |A2| stores the accumulation value A2 of the second addition logic circuit +2, and the third memory |A3| stores the accumulation value A3 of the third addition logic circuit +3.

When an accumulation value stored in a predetermined memory is equal to or above a predetermined value, the first through third controllers RCA CTL1 through RCA CTL3 shift the accumulation values A1 through A3 of the first through third memories |A1| through |A3| to a direction an accumulation value decreases, and shift the input values IN1 through IN3 as much as the accumulation values A1 through A3 are shifted. Also, the first through third controllers RCA CTL1 through RCA CTL3 transmit the shifted accumulation values A1 through A3 and the shifted input values IN1 through IN3 to their corresponding first through third addition logic circuits +1 through +3.

In this case, the first through third controllers RCA CTL1 through RCA CTL3 may be respectively connected to the first through third addition logic circuits +1 through +3. Accordingly, as shown in FIG. 5, the adders RCA1 through RCA3 may respectively include the first through third addition logic circuits +1 through +3 and the first through third controllers RCA CTL1 through RCA CTL3 respectively corresponding to the first through third addition logic circuits +1 through +3. Here, each of the first through third controllers RCA CTL1 through RCA CTL3 must be able to determine information about the accumulation values A1 through A3 of the memories |A1| through |A3|.

Also, it has been described that the first through third addition logic circuits +1 through +3 respectively include the memories |A1| through |A3|, however a memory may be disposed outside the first through third addition logic circuits +1 through +3 and used when the first through third addition logic circuits +1 through +3 perform an adding operation.

The operations of the adders RCA1 through RCA3 will now be described in more detail through detailed examples.

Figure 7:
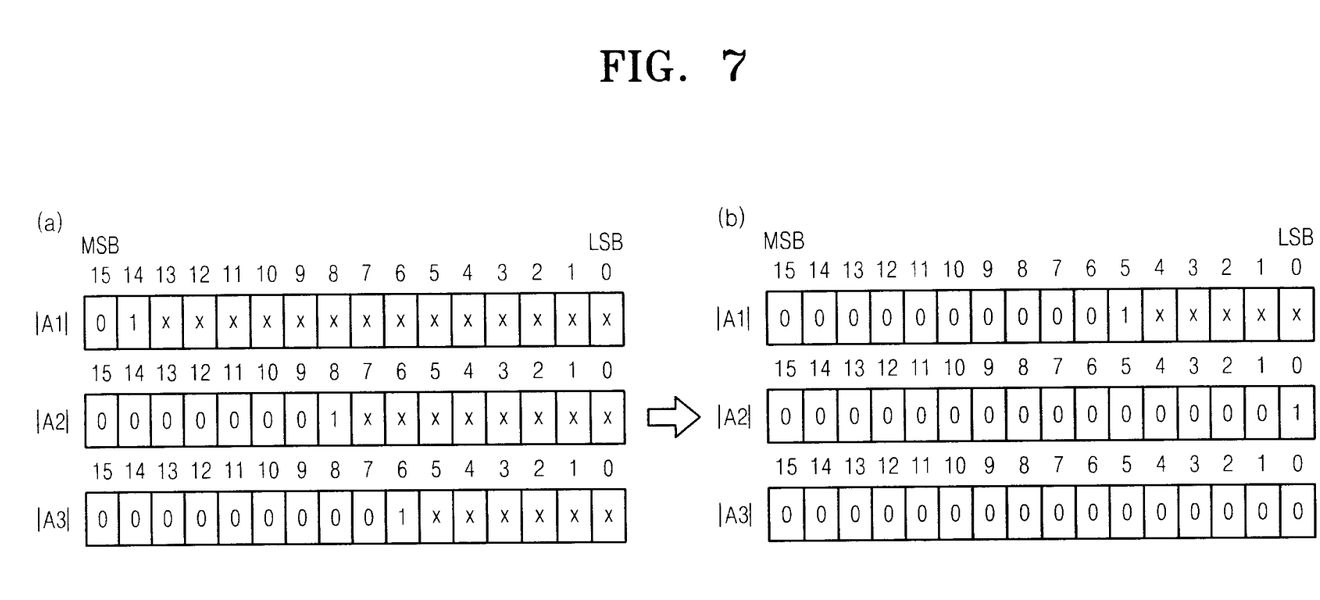
FIG. 7 is a diagram showing a process of shifting an accumulation value in a memory so as to describe an operation of the adders of FIG. 5.

FIG. 7 is a diagram showing a process of shifting an accumulation value in a memory so as to describe an operation of the adders RCA1 through RCA3 of FIG. 5. FIG. 7(a) shows accumulation values stored in each memory before being shifted, and FIG. 7(b) shows accumulation values stored in each memory after being shifted. For convenience of description, the process will now be described together with reference to FIG. 5.

Referring to FIG. 7, the first through third memories |A1| through |A3| each have a size of 16 bits. As described above, the first through third addition logic circuits +1 through +3 output the accumulation values A1 through A3 by adding the input values IN1 through IN3 and the storage values OUT1 through OUT3.

When i MSBs of an accumulation value stored in one of the first through third memories |A1| through |A3| have a value of k (k is an integer), the first through third controllers RCA CTL1 through RCA CTL3 compare accumulation values of the remaining memories. When a location of the MSB, having a logic high value, i.e. 1, of a memory having the largest accumulation value from among the remaining memories is N (N is an integer), the first through third controllers RCA CTL1 through RCA CTL3 shift the accumulation values A1 through A3 by predetermined bits corresponding to N bits to a direction the corresponding accumulation value decreases in the first through third memories |A1| through |A3| i.e. to a LSB direction.

For example, it is assumed that the first through third controllers RCA CTL1 through RCA CTL3 perform a shifting operation when i is 2 and k is 1, i.e. when 2 MSBs have a value of 01. Also, it is assumed that the accumulation values A1 through A3 respectively stored in the first through third memories |A1| through |A3| at a predetermined point of time are as shown in FIG. 7(a). In other words, it is assumed that the accumulation value A1 of the first memory |A1| is "01xxxxxxxxxxxxxx", the accumulation value A2 of the second memory |A2| is "00000001xxxxxxx", and the accumulation value A3 of the third memory |A3| is "0000000001xxxxx". Here, x may be 0 or 1.

The first through third controllers RCA CTL1 through RCA CTL3 detect that the 2 MSBs of the accumulation value A1 stored in the first memory |A1| have a value of "01". Then, the first through third controllers RCA CTL1 through RCA CTL3 compare the accumulation values A2 and A3 of the second and third memories |A2| and |A3|, excluding the first memory |A1|. Here, the accumulation values A2 and A3 may be compared by all controllers receiving accumulation information from another controller or by one controller receiving accumulation information from another controller.

Referring to FIG. 7(a), the accumulation value A2 of the second memory |A2| is larger than the accumulation value A3 of the third memory |A3|. Accordingly, the first through third controllers RCA CTL1 through RCA CTL3 search for a location N of the MSB having a value of 1 from among bits of the accumulation value A2 of the second memory |A2|.

As a result, it is determined that the location N of the MSB having a value of 1 from among bits of the accumulation value A2 is 9. However, since LSB is counted from "0", it is shown that the location N is 8.

Once the first through third controllers RCA CTL1 through RCA CTL3 obtain the location N, the first through third controllers RCA CTL1 through RCA CTL3 shift the accumulation values A1 through A3 in the first through third memories |A1| through |A3| by N−1 bits to a LSB direction. Also, the input values IN1 through IN3 are shifted by N−1 bits to the LSB direction. Here, N−1 is an example, and thus is not limited. However, when the accumulation values A1 through A3 and the input values IN1 through IN3 are shifted by at least N bits, the accumulation values A2 and A3 all become 0, and thus may be shifted by N−1 bits or less.

As a result, the accumulation values A1 through A3 illustrated in FIG. 7(a) are shifted by 8 bits to the LSB direction as illustrated in FIG. 7(b). Meanwhile, although it is not illustrated, the input values IN1 through IN3 are shifted similarly as the accumulation values A1 through A3. In other words, the input values IN1 through IN3 are shifted by 8 bits to the LSB direction.

The first through third controllers RCA CTL1 through RCA CTL3 repeat such a shifting operation M times (M is an integer) while calculating a correlation value, and output an accumulation value of a memory where the i MSBs of the accumulation value have a value of k as the maximum accumulation value. Here, M may be predetermined by a user or a system designer before an adding operation.

As such, an adder according to an embodiment of the present invention is able to perform more adding operations by performing such a shifting operation, even when the capacity of one memory is full. Accordingly, the maximum accumulation value is obtained by using an input value and an accumulation value having a size smaller than an actual correlation value, and thus an adding speed is increased. Moreover, the adder prevents a change of an operation speed of an OFDM communication system due to a size of a correlation value.

As described above, when the FFT mode is detected by using the first mode detecting unit 420, a symbol size of a received OFDM signal is determined. Then, a starting point of an effective symbol is searched for by determining the length of a protection period by detecting a GI mode. The detecting of the GI mode may be performed by the second mode detecting unit 440 illustrated in FIG. 3 and which will now be described with reference to FIG. 8.

Figure 8:
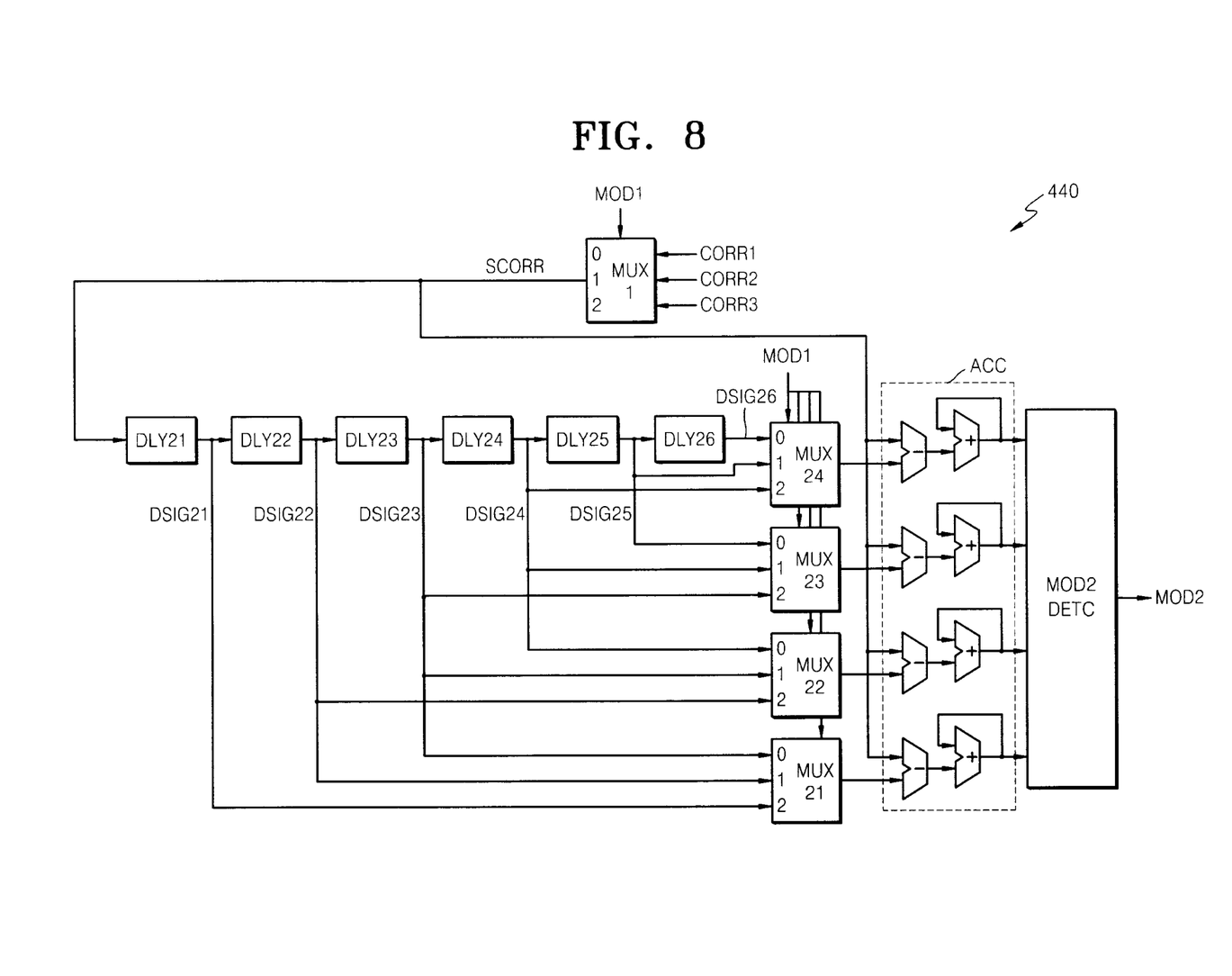
FIG. 8 is a block diagram illustrating in detail a second mode detecting unit shown in FIG. 3.

FIG. 8 is a block diagram illustrating in detail the second mode detecting unit 440 illustrated in FIG. 3.

Referring to FIG. 8, the second mode detecting unit 440 detects a second mode MOD2 of the received signal InSIG by using second delay signals DSIG21 through DSIG26 obtained by delaying a selection correlation value SCORR corresponding to the detected first mode MOD1 from among the first correlation values CORR1 through CORR3, and the selection correlation value SCORR corresponding to the first mode MOD1. Here, the second mode MOD2 may be a GI mode, and hereinafter, the second mode MOD2 is described as the GI mode.

In order to detect the second mode MOD2, the second mode detecting unit 440 may include a first selection circuit MUX1, second delay circuits DLY21 through DLY26, second selection circuits MUX21 through MUX24, an accumulation value calculator ACC, and a second mode detector MOD2 DETC.

The first selection circuit MUX1 selects the selection correlation value SCORR from among the first correlation values CORR1 through CORR3, in response the first mode MOD1.

The second delay circuits DLY21 through DLY26 respectively generate the second delay signals DSIG21 through DSIG26 by delaying the selection correlation value SCORR. The number of second delay circuits DLY21 through DLY26 may correspond to the number of types of the first mode MOD1.

In response to the detected first mode MOD1 and the type of a GI mode corresponding to the first mode MOD1, the second selection circuits MUX21 through MUX24 output one of the second delay signals DSIG21 through DSIG26. As described above, the GI mode may be one from among ¼, ⅛, 1/16, and 1/32.

For example, it is assumed that the second delay circuits DLY21 and DLY22 each delay a received signal by 64 samples, the second delay circuit DLY23 delays a received signal by 128 samples, and the second delay circuit DLY24 delays a received signal by 256 samples. Similarly, it is assumed that the second delay circuit DLY25 delays a received signal by 512 samples, and the second delay circuit DLY26 delays a received signal by 1024 samples.

Accordingly, the second delay signal DSIG21 output from the second delay circuit DLY21 is delayed by 64 samples from the selection correlation value SCORR, the second delay signal DSIG22 output from the second delay circuit DLY22 is delayed by 128 samples from the selection correlation value SCORR, and the second delay signal DSIG23 output from the second delay circuit DLY23 is delayed by 256 samples from the selection correlation value SCORR. Similarly, the second delay signal DSIG24 output from the second delay circuit DLY24 is delayed by 512 samples from the selection correlation value SCORR, the second delay signal DSIG25 output from the second delay circuit DLY25 is delayed by 1024 samples from the selection correlation value SCORR, and the second delay signal DSIG26 output from the second delay circuit DLY26 is delayed by 2048 samples from the selection correlation value SCORR.

As described above, each of the second selection circuits MUX21 through MUX24 may output one of the second delay signals DSIG 21 through DSIG26, according to the detected FFT mode and its type of corresponding GI mode.

For example, in FIG. 8, it is assumed that the second selection circuit MUX21 corresponds to a 1/32 GI mode, and the second selection circuit MUX22 corresponds to a 1/16 GI mode. Similarly, it is assumed that the second selection circuit MUX23 corresponds to a ⅛ GI mode, and the second selection circuit MUX24 corresponds to a ¼ GI mode.

Here, the second selection circuit MUX21 receiving the second delay signals DSIG21 through DSIG23 may output the second delay signal DSIG21 that is delayed by 64 (=2K/32) samples when the FFT mode is 2K, output the second delay signal DSIG22 that is delayed by 128 (=4K/32) samples when the FFT mode is 4K, and output the second delay signal DSIG23 that is delayed by 256 (=8K/32) samples when the FFT mode is 8K.

Similarly, the second selection circuit MUX22 receiving the second delay signals DSIG22 through DSIG24 may output the second delay signal DSIG22 that is delayed by 128 (=2K/16) samples when the FFT mode is 2K, output the second delay signal DSIG23 that is delayed by 256 (=4K/16) samples when the FFT mode is 4K, and output the second delay signal DSIG24 that is delayed by 512 (=8K/16) samples when the FFT mode is 8K.

The accumulation value calculator ACC calculates a correlation value according to each GI mode as an accumulation value, by repeatedly performing a subtracting and addition operation on the selection correlation value SCORR and outputs of the second selection circuits MUX21 through MUX24. The accumulation value calculator ACC is a device for moving sum, and well known to one of ordinary skill in the art, and thus details thereof are omitted herein.

The second mode detector MOD2 DETC detects the second mode MOD2 based on the accumulation value of the selection correlation value SCORR.

Figure 9:
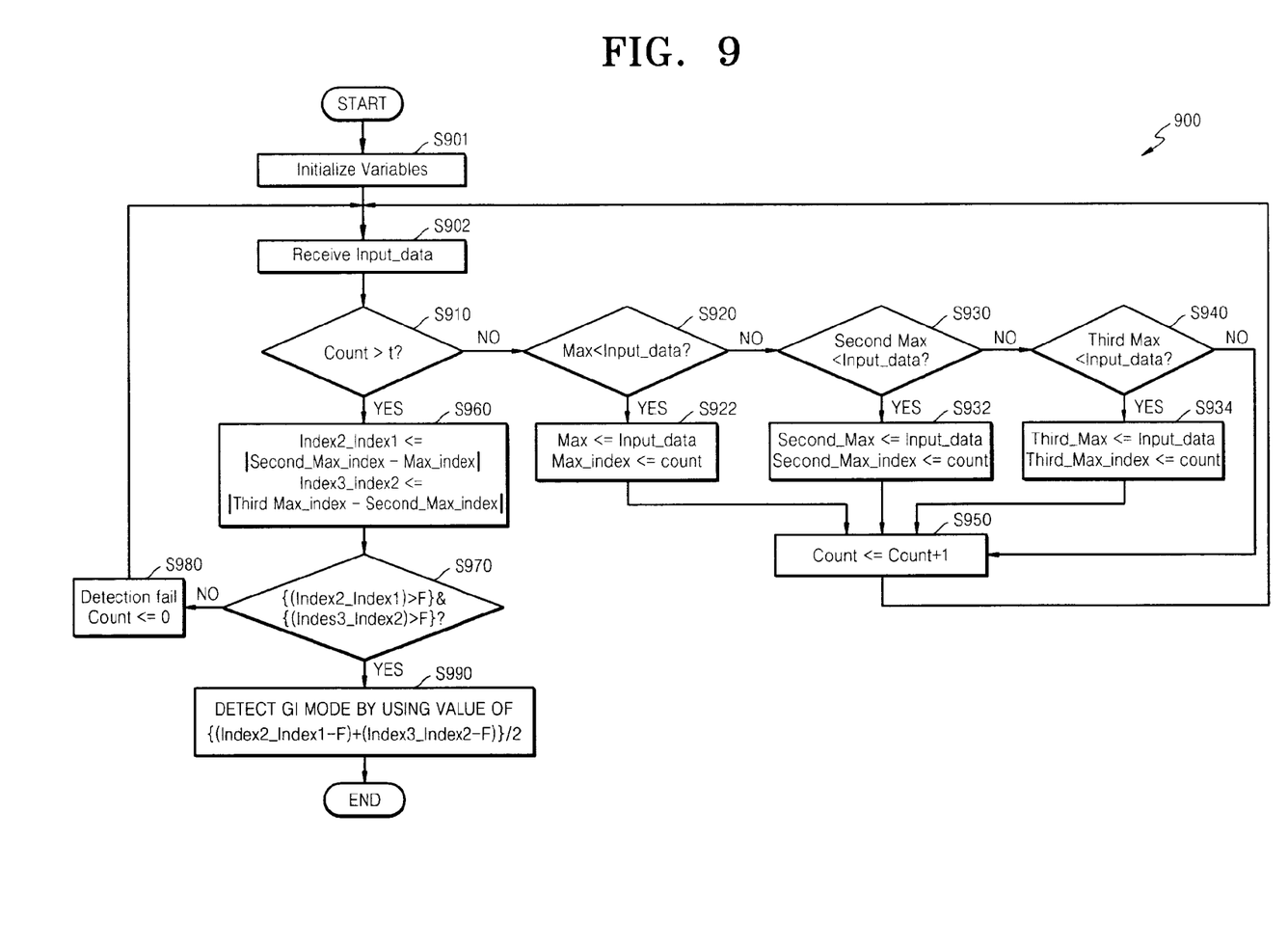
FIG. 9 is a flowchart illustrating an operation of a second mode detector of FIG. 8.

FIG. 9 is a flowchart illustrating an operation 900 of the second mode detector MOD2 DETC of FIG. 8. For convenience of description, the operation 900 will be described with reference to FIGS. 8 and 9.

Referring to FIG. 9, the second mode detector MOD2 DETC initializes each variable, i.e., count, and first through third maximum values, etc., in operation S901, and then receives an accumulation value output from the accumulation value calculator ACC so as to detect a second mode MOD2, i.e., a GI mode, in operation S902. Here, the received accumulation value is indicated as Input_data. When the accumulation value Input_data is received, a count of the accumulation value Input_data and a predetermined estimation range value t are compared, in operation S910. Here, the count is a variable that is initially set to 0, continuously increases by 1 until the count reaches the estimation range value t, and corresponds to a sample index of the accumulation value Input_data.

Then, when the count is equal to or lower than the estimation range value t, the accumulation value Input_data is compared with a maximum value according to a size order, and then is classified according to the size order, in operations S920, S930, and S940. In other words, the accumulation value Input_data is compared with a first maximum value Max, in operation S902, and when the accumulation value Input_data is greater than the first maximum value Max, the first maximum value Max is set by inputting the accumulation value Input_data as the first maximum value Max, in operation S922. In operation S922, a first maximum value index Max_index is also set by inputting the count as the first maximum value index Max_index.

Meanwhile, when the accumulation value Input_data is equal to or lower than the first maximum value Max, the accumulation value Input_data is compared with a second maximum value Second Max, in operation S930. When the accumulation value Input_data is greater than the second maximum value Second Max, the second maximum value Second Max is set, in operation S932, by inputting the accumulation value Input_data as the second maximum value Second Max. In operation S932, a second maximum value index Second_Max_index is also set by inputting the count as the second maximum value index Second_Max_index.

Alternatively, when the accumulation value Input_data is equal to or lower than the second maximum value Second Max, the accumulation value Input_data is compared with a third maximum value Third Max, in operation S940. When the accumulation value Input_data is greater than the third maximum value Third Max, the third maximum value Third Max is set by inputting the accumulation value Input_data as the third maximum value Third Max, in operation S942. In operation S942, a third maximum value index Third_Max_index is also set by inputting the count as the third maximum value index Third_Max_index.

Here, as described above, the first through third maximum values Max through Third Max and the first through third maximum value indexes Max_index through Third_Max_index are predetermined before detecting the second mode MOD2. The first through third maximum values Max through Third Max and the first through third maximum value indexes Max_index through Third_Max_index are variables, and may be initially set to any value. However, the first through third maximum values Max through Third Max are set in a size order.

In the current embodiment, three maximum values, the first through third maximum values Max through Third Max, are obtained, but the number of maximum values may be more than 3.

After operations S922, S932, and S942, the count is increased by 1 in operation S950, and operation S902 is performed. Here, operation S950 is performed even when the accumulation value Input_data is equal to or lower than the third maximum value Third Max. Operations S902 through S950 are performed until the count exceeds the estimation range value t. Here, the estimation range value t may be set as a suitable value, and may be the number of samples included in 4 symbols so as to detect an effective GI mode.

Through the above processes, dominant maximum values in the GI mode are input as the first through third maximum values Max through Third Max, and indexes in the GI mode are input as the first through third maximum value indexes Max_index through Third_Max_index. Such results are inevitable results according to a moving sum in the accumulation value calculator ACC via a signal delay.

When the count is greater than the estimation range value t, a new variable corresponding to a difference between indexes is set in operation S960. In other words, an absolute value of a value obtained by subtracting the first maximum value index Max_index from the second maximum value index Second_Max_index is input as a $21^{st}$ subtraction index Index2_Index1. Also, an absolute value of a value obtained by subtracting the second maximum value index Second_Max_index from the third maximum value index Third_Max_index is input as a $32^{nd}$ subtraction index Index3_Index2.

Then, the $21^{st}$ subtraction index Index2_Index1 and the $32^{nd}$ subtraction index Index3_Index2 are compared with a length (F=2K, 4K, and so on) of the FFT mode detected by the first mode detecting unit 420, in operation S970. As described above, generally, the first through third maximum value indexes Max_Index through Third_Max_index are shown in the GI mode, and accordingly, the $21^{st}$ subtraction index Index2_Index1 and the $32^{nd}$ subtraction index Index3_Index2 are longer than the length of the FFT mode. Accordingly in operation S970, when both of the $21^{st}$ subtraction index Index2_Index1 and the $32^{nd}$ subtraction index Index3_Index2 are longer than the length of the FFT mode, it is determined that the GI mode is detected, and operation S990 is performed. Otherwise, i.e., when either of the $21^{st}$ subtraction index Index2_Index1 and the $32^{nd}$ subtraction index Index3_Index2 is shorter than the length of the FFT mode, it is determined that the GI mode is not detected, and thus the count is re-set to 0 and operation S910 is performed.

Meanwhile, when it is determined that the GI mode is detected, a value obtained by subtracting the length of the FFT mode from the $21^{st}$ subtraction index Index2_Index1 and a value obtained by subtracting the length of the FFT mode from the $32^{nd}$ subtraction index Index3_Index2 are added and then divided by 2, so as to detect the GI mode in operation S990. Here, any one of the value obtained by subtracting the length of the FFT mode from the $21^{st}$ subtraction index Index2_Index1 and the value obtained by subtracting the length of the FFT mode form the $32^{nd}$ subtraction index Index3_Index2 may be set as the GI mode, however in order to accurately detect the GI mode, an average value may be used to detect the GI mode.

In the current embodiment, the above operations are repeated t times. Here, since the accumulation value calculator ACC transmits outputs of 4 types of the GI mode to the second mode detector MOD2 DETC, reliability is obtained as the second mode detector MOD2 DETC compares the accumulation value Input_data with the 4 types of the GI mode.

When an OFDM receiving apparatus according to an embodiment of the present invention detects a FFT mode and a GI mode via the above operations, a starting point of an effective symbol is calculated and a symbol unit is classified, by adding a length of a protection period according to the GI mode determined based on a maximum value index. Also, by performing FFT on each symbol from the starting point of the effective symbol, input data may be estimated as Equation 2 above.

As such, an OFDM receiving apparatus and a mode detecting method of the present invention detect a FFT mode first and then detect a GI mode based on the detected FFT mode on the same signal, and thus mode detection can be accurately and quickly performed, and moreover, a chip size can be reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A mode detecting method performed by an orthogonal frequency division multiplexing (OFDM) receiving apparatus, the mode detecting method comprising:
    detecting a first mode of a received signal by using first delay signals obtained by delaying the received signal, and first correlation values of the received signal; and
    detecting a second mode of the received signal by using second delay signals obtained by delaying a first correlation value corresponding to the first mode from among the first correlation values, and the first correlation value corresponding to the first mode, wherein the detecting of the second mode comprises:
selecting one of the second delay signals according to the first mode;
calculating an accumulation value for the second mode by subtracting and adding the selected delay signal and the first correlation value; and
detecting the second mode based on the calculated accumulation value, and wherein the detecting of the second mode based on the calculated accumulation value comprises:
receiving the accumulation values;
obtaining a first maximum value through an i-th maximum value according to a size order of the received accumulation values, wherein i is an integer of 2 or above;
obtaining a first maximum value index through an i-th maximum value index with respect to the first through i-th maximum values; and
increasing a count of the calculated accumulation value by 1, after obtaining the first through i-th maximum value indexes.

2. The mode detecting method of claim 1, wherein the detecting of the first mode comprises:
obtaining accumulation values of the first correlation values;
calculating a maximum accumulation value from among the accumulation values; and
detecting the first mode based on the maximum accumulation value.

3. The mode detecting method of claim 1, wherein the number of first delay signals corresponds to the number of types of the first mode.

4. The mode detecting method of claim 1, wherein the detecting of the second mode based on the calculated accumulation value further comprises:
comparing a count of the calculated accumulation value corresponding to an sample index of the accumulation value with a predetermined estimation range value; and
comparing an absolute value of a difference between two indexes from among the first through i-th maximum value indexes with the size of the first mode,
wherein when the count of the calculated accumulation value is lower than the estimation range value, the obtaining of the first through i-th maximum values is performed, and when the count of the calculated accumulation value is greater than the estimation range value, the comparing of the absolute value with the size of the first mode is performed.

5. The mode detecting method of claim 4, wherein, in the detecting of the second mode based on the calculated accumulation value, when the absolute value is lower than the size of the first mode, it is determined that the detecting of the second mode has failed, and thus the count of the calculated accumulation value is initialized and the accumulation values are received, and when the absolute value is greater than the size of the first mode, the second mode is calculated.

6. The mode detecting method of claim 5, wherein, in the calculating of the second mode, the second mode is calculated by using an average value of values obtained by subtracting the first mode from the absolute value.

7. The mode detecting method of claim 1, wherein, in the detecting of the second mode based on the calculated accumulation value, the first through i-th maximum values are re-set whenever the accumulation value is received.

8. The mode detecting method of claim 1, wherein the first mode is a fast Fourier transform (FFT) mode, and the second mode is a guard interval (GI) mode.

9. The mode detecting method of claim 1, wherein the number of second delay signals corresponds to the number of types of the first and second modes.

10. The mode detecting method of claim 1, wherein the first mode has a value from among 2K, 4K, and 8K, and the second mode has a value from among ¼, ⅛, 1/16, and 1/32.

11. An orthogonal frequency division multiplexing (OFDM) receiving apparatus comprising:
a first mode detecting unit which detects a first mode of a received signal by using first delay signals obtained by delaying the received signal, and first correlation values of the received signal; and
a second mode detecting unit which detects a second mode of the received signal by using second delay signals obtained by delaying a first correlation value corresponding to the first mode from among the first correlation values, and the first correlation value corresponding to the first mode,
wherein the first mode detecting unit comprises:
first delay circuits which generate the first delay signals by delaying the received signal;
a conjugator which obtains a conjugate signal of the received signal;
multipliers which output the first correlation values by multiplying a corresponding first delay signal from among the first delay signals by the conjugate signal;
adders which obtain an accumulation value of a corresponding first correlation value from among the first correlation values; and
a first mode detector which calculates a maximum accumulation value from among the accumulation values and detects the first mode based on the maximum accumulation value.

12. The OFDM receiving apparatus of claim 11, wherein the number of first delay circuits corresponds to the number of types of the first mode.

13. The OFDM receiving apparatus of claim 11, wherein the second detecting unit comprises:
a first selection circuit which outputs one of the first correlation values, in response to the first mode as a selected first correlation value;
second delay circuits which generate the second delay signals by delaying the selected first correlation;
second selection circuits which output one of the second delay signals, in response to the first mode as a selected second delay signal;
an accumulation value calculator which calculates an accumulation value of the first correlation value, by subtracting and adding the selected second delay signal and the selected first correlation value; and
a second mode detector which detects the second mode based on the calculated accumulation value.

14. The OFDM receiving apparatus of claim 12, wherein the second mode detector receives the accumulation values from the accumulation value calculator, obtains a first maximum value through an i-th maximum value according to a size order of the accumulation values, obtains a first maximum value index through an i-th maximum value index with respect to the first through i-th maximum values, wherein i is an integer of 2 or above, and then detects the second mode by comparing an absolute value of a difference between two predetermined indexes from among the first through i-th maximum value indexes with the first mode.

15. The OFDM receiving apparatus of claim 14, wherein the second mode detector calculates an average value of values obtained by subtracting the first mode from the absolute value as the second mode.

16. The OFDM receiving apparatus of claim 11, wherein the first mode is a fast Fourier transform (FFT) mode and the second mode is a guard interval (GI) mode.

* * * * *